INVENTORS
R. B. HANER, W. G. PETTITT JR
H. C. SIBLEY, AND P. C. SUTTON
BY
THEIR ATTORNEY

INVENTORS
R. B. HANER, W. G. PETTITT, JR
H. C. SIBLEY, AND P. C. SUTTON
BY

*Forest D. Hitchcock*

THEIR ATTORNEY

United States Patent Office 3,435,223
Patented Mar. 25, 1969

3,435,223
STABILIZATION OF AN INFRARED DETECTOR CELL AS USED IN THERMAL WHEEL SCANNER SYSTEMS
Robert B. Haner, Jr., Scottsville, Henry C. Sibley, Adams Basin, and Paul C. Sutton and Walter G. Pettitt, Rochester, N.Y., assignors to General Signal Corporation, Rochester, N.Y., a corporation of New York
Filed Apr. 11, 1966, Ser. No. 541,769
Int. Cl. G01t 1/16; G12b 7/00
U.S. Cl. 250—83.3                                    11 Claims

ABSTRACT OF THE DISCLOSURE

Improved apparatus for the detection of defective bearings in which an infrared detector cell compensated relative to changes in ambient temperature provides an output signal at a substantially constant level for bearing temperatures, a fixed differential magnitude above ambient temperature.

---

The present invention relates to a device for detecting over-heated elements including wheels and bearings on moving railway vehicles and more particularly it relates to the stabilization of an infrared detection cell.

A critically important factor in the maintenance of railway systems is detection of incipient bearing failure prior to catastrophe. Amongst other indicia, bearing temperature is indicative of condition for continued service. The latest detecting systems use an infrared detector cell for sensing bearing temperature. The cell responds to the radiated energy of a point on the vehicle close to the bearing (e.g., wheel hub) and the system circuitry relates the cell response to bearing temperature. A corresponding signal is then transmitted through appropriate circuitry to control apparatus.

The use of infrared detectors is not however without problem. Under actual conditions the cell must be capable of operating under and withstanding wide environmental variances. The most critical of these environmental conditions is temperature.

The radiation energy transmitted by a body is proportional to the fourth power of its absolute temperature. The wheels and bearings of the vehicle are exposed to ambient and therefore their radiant energy will vary in accordance with ambient temperature. This variation in radiant energy, unless satisfactorily eliminated and dependent upon the desired accuracy of threshold measurement, may result in the transmittal of ambiguous signals into the control apparatus producing indications not commensurate to the actual condition of the bearing.

The response of the infrared detector itself is affected by the temperature of its environment. At low temperatures the cell has an inherently increased sensitivity but indicates an apparent decrease due to a rapid rise of detector cell impedance and the resultant mismatch with associated circuitry. At high temperatures both the cell sensitivity and signal-to-noise ratio are substantially decreased and moreover there is the possibility of cell self-burnout. It is thus clear that effective operation of thermal wheel scanner systems or as they are more commonly known "hot box" detector systems is greatly dependent upon the temperature of their environment.

Detector systems currently in use have with varying degrees of success proven capable of meeting specified operation and maintenance requirements. They are however prone to signal variations introduced by temperature effects. Prior art has introduced various schemes for eliminating the sensing errors and deleterious effects induced by temperature. In the main, these schemes have maintained the detector cell at a relatively constant temperature below ambient or as in the instance of Cook Patent No. 3,225,201 at a fixed temperature sufficiently low so as to provide an acceptable signal-to-noise ratio. The prior art does not however, prevent the occurrence of variations in detector signal output caused by changes in ambient temperature. The present invention, by the appropriate application of detector cell cooling and bias voltage compensation, overcomes this problem and permits the formation of detection systems essentially free of ambiguities in indicating the condition of bearings.

It is therefore an object of this invention to provide an improved over-heated wheel bearing detector system capable of operating without signal ambiguity at any reasonable level of ambient temperature.

Another object of this invention is to provide compensation so as to produce a constant detector cell signal output over the operating ambient temperature range for any target temperature a particular number of degrees above ambient temperature.

Another object of this invention is to provide detector cell bias voltage compensation.

Yet another object of this invention is to provide cooling for the infrared detector cell.

Other objects and a more thorough understanding of the embodiment of this invention can be ascertained by study of the following description and drawings. The following is a digest of the content of the drawings.

In accordance with the present invention, there is presented an improved defective bearing detection system having an infrared detector cell for giving an output signal relative to the temperature of the bearing. The improvement comprises ambient temperature sensing means and means responsive to the ambient temperature sensing means for controlling the output of the detector cell as a function of ambient temperature.

Figure 1:
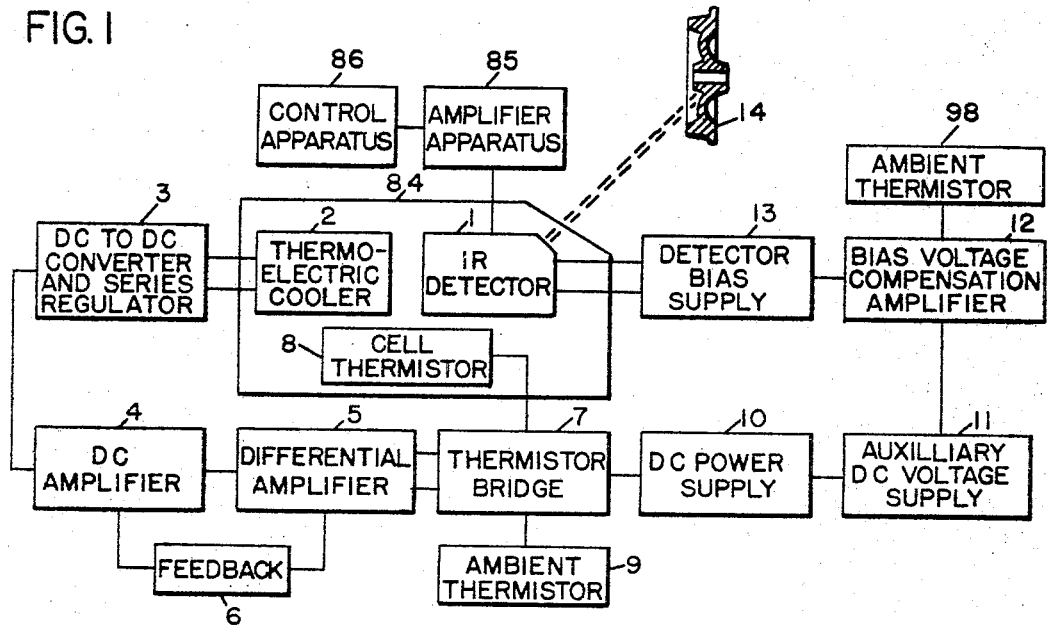
FIG. 1 shows a functional block diagram of the detector cell and its associated equipment.
Figure 2:
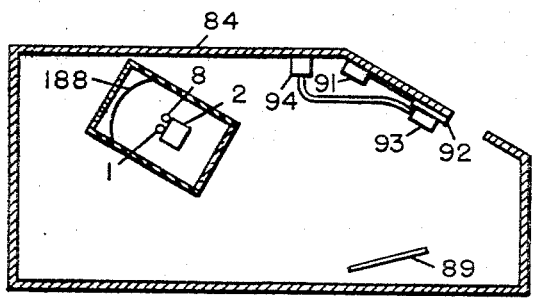
FIG. 2 shows a cross-sectional view of the scanner housing containing typical equipment used with this invention.
Figure 3:
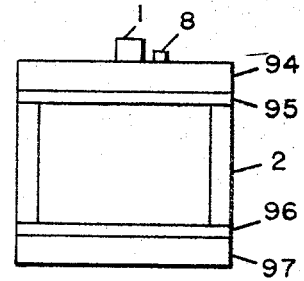
FIG. 3 shows a conventional configuration for the relative mounting of the thermoelectric cooler, infrared detector cell and detector cell thermistor.

Thermal wheel scanner systems generally include a scanner housing located at trackside containing the radiation detector with its associated equipment and a remotely located equipment housing containing amplifier and control circuitry. Embodiment of the present invention presented in the functional block diagram of FIG. 1 shows a scanner housing 84 in which is located an infrared detector cell 1, thermoelectric cooler 2, and detector cell thermistor 8 all mounted in close thermal relation. FIGS. 2 and 3, later to be described, show the contents of the scanner housing and a conventional mounting for the detector cell 1 and thermistor 8 to the thermoelectric cooler 2, which are not completely shown in FIG. 1.

The infrared detector cell 1 responds to the radiant energy transmitted by the wheel hub 14 (see FIG. 1) and produces a corresponding signal which is conducted to the amplifier apparatus 85 and thence to the control apparatus 86 as shown for example in Sibley Patent No. 3,183,350 which describes in detail the operation and configuration of typical amplifier and control apparatus.

The cell thermistor 8 senses the temperature of the detector cell 1 and electrically forms a part of the thermistor bridge 7. The thermistor bridge 7 produces a signal output proportional to the ratio of detector cell 1 to ambient temperature (i.e. temperature of environment outside scanner housing) as indicated by the cell thermistor 8 and ambient thermistor 9 which is remotely located for sensing ambient temperature but electrically is part of the thermistor bridge 7 circuitry. This signal output is conducted to the differential amplifier 5. After amplification it is fed to the direct current amplifier 4 for further amplifying. The feedback 6 conducts a portion of the direct current amplifier output back to the input of differential amplifier 5 to achieve increased stability characteristics. The output of the direct current amplifier 4 is used to control the output voltage of the D.C. to D.C. converter and series regulator 3 which in turn provides energizing current for the thermoelectric cooler 2, resulting in a cooling rate controlled by chosen circuit parameters of the thermistor bridge 7.

The bias voltage compensation amplifier 12 receives its excitation from the auxiliary D.C. voltage supply 11 and is controlled by the ambient thermistor 98 which senses ambient temperature and electrically is part of the bias voltage compensation amplifier 12. The bias voltage compensation 12 establishes an increasing bias voltage with decreasing ambient temperature. The output of this amplifier is conducted to detector bias supply 13 where it is added to the normal detector bias voltage resulting in the desired low temperature bias voltage compensation. The energy source for the bias voltage compensation circuitry as well as the temperature control circuitry is D.C. power supply 10.

FIG. 2 previously referred to indicates the equipment and their relative orientation as contained in the scanner housing 84. The scanner housing has an aperture in its upper portion to admit incident radiation from the hub 14. This aperture opening is controlled by the action of a shutter 92 which is operated by motor 91, energized throughout the passage of a train as effected by the passage of vehicle wheels described in the aforementioned Sibley patent. Under severe weather conditions the shutter is liable to be covered with ice or snow. To obviate the effect of this upon shutter operation, a shutter electric heater 93 is attached. The operation of this electric heater 93 is controlled by thermostat 94.

As the incident rays pass through the scanner housing opening, they are reflected by a mirror surface 89 directing the rays toward a concave reflecting surface 188 which then focuses the energy upon detector cell 1. As is indicated in this drawing, detector cell thermistor 8 and thermoelectric cooler 2 are mounted in close proximity to the detector cell 1. FIG. 3 discloses in greater detail the physical aspects of this relative mounting configuration. Infrared detector cell 1 and detector cell thermistor 8 are mounted on a copper base 94 thus assuring that cell thermistor 8 indicates the same temperature as the detector cell 1. The copper base 94 is suitably attached to an electrical insulator and thermal conductor 95. This electrical insulator and thermal conductor 95 allows for the passage of thermal energy but prevents the passage of electric energy. It in turn is fastened to the thermoelectric cooler 2. Interposed between the thermoelectric cooler 2 and a copper base 97 is another electrical insulator and thermal conductor 96. The copper base 97 acts as a heat sink for the hot junction of the thermoelectric cooler 2 and allows dissipation of generated heat to the surrounding environment.

Figure 4:
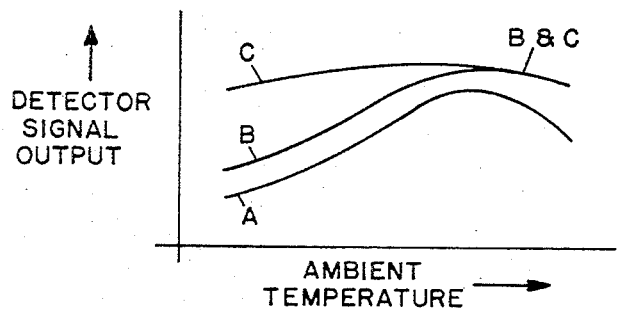
FIG. 4 shows a series of three detector cell response curves demonstrating the relative signal output for an uncompensated cell (curve A), a partly compensated cell (curve B), and a fully compensated cell (curve C).

The operation of the present invention controls the output of the detector cell 1 so as to prevent output signal variations introduced by changes in ambient temperature, scanner housing shutter heater operation or other causes of detector cell temperature change either intrinsic or extrinsic to the system. This is accomplished firstly by choosing a detector cell ballast resistor which results in a cell response curve with as little variation as possible while operating over the entire ambient temperature range and producing a signal compatible with required sensitivity (see FIG. 4 curve A representing a typical response resulting from the proper selection of a ballast resistor). Secondly, the detector cell 1 is cooled by means of the thermoelectric cooler 2. Thermoelectric devices are familiar to those skilled in the art. Such devices utilize the Peltier effect, i.e., when a current is passed through two contacting metals of different electromotive potentials, there appears a hot junction and a cold junction; the cooling and heating rate of which are proportional to the magnitude of the current. In this instance, the cool junction of the thermoelectric cooler 2 is mounted in close thermal relation to the detector cell 1. Cooling of the detector cell 1 increases sensitivity and results in a high signal output with a more pronounced response peak (see FIG. 4 curve B). The applied cooling rate is maintained relatively constant except at the high temperature ranges where it is substantially increased to overcome the inherent decrease in sensitivity. Inspection of the aforementioned curve B indicates a relatively flat response at the mid and high ambient temperatures; remaining is the signal fall-off due to mismatch of impedances at low temperatures. This is obviated by introduction of increasing detector cell bias voltage for decreasing temperatures. The increase in detector cell bias voltage produces an apparent rise in detector cell sensitivity and negates the signal loss due to impedance mismatch (see curve C FIG. 4). Curve C demonstrates the realization of a relatively constant detector cell response over the entire operating ambient temperature range for radiation targets a particular temperature differential above ambient.

Figure 5:
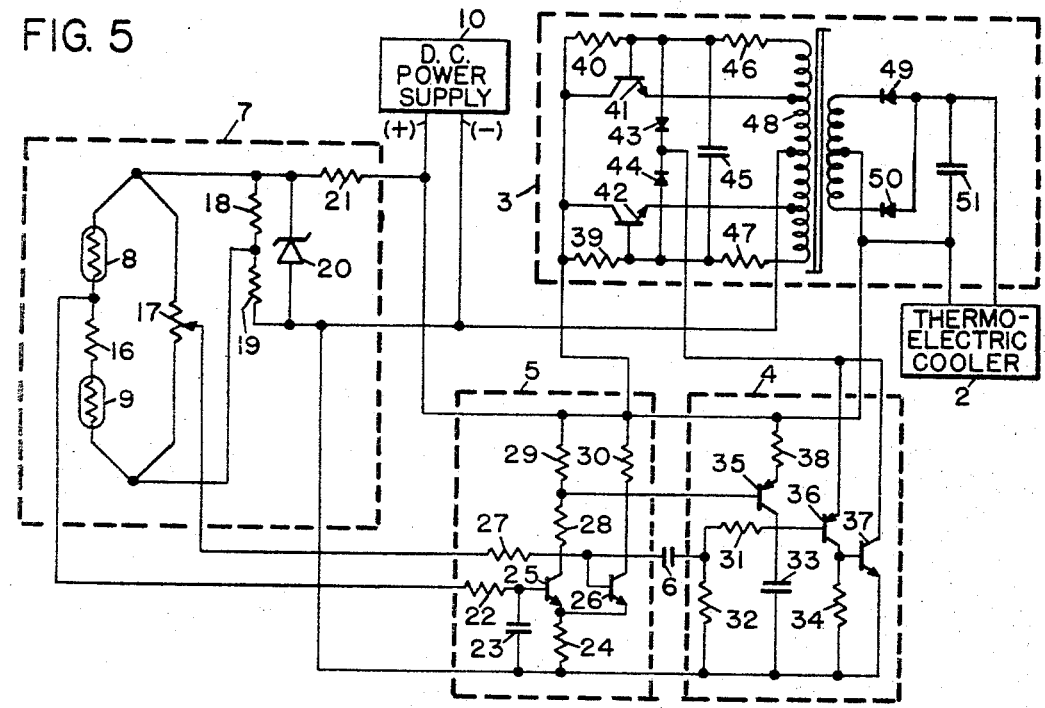
FIG. 5 shows a schematic diagram of the circuitry for control of the thermoelectric cooler.
Figure 6:
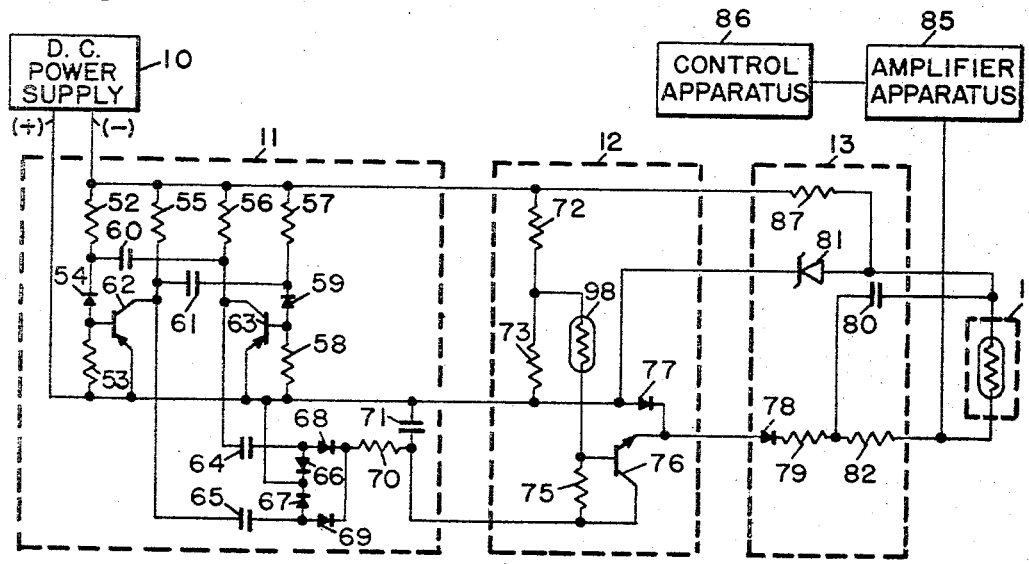
FIG. 6 shows a schematic diagram of the circuitry for the low temperature detector cell bias voltage compensation.

The ensuing paragraphs referring to typical circuitry as shown in FIGS. 5 and 6 permit a more detailed analysis of operation.

In FIG. 5 the D.C. power supply 10 supplies plus (+) and minus (−) voltages for energizing the circuitry. Zener diode 20 in conjunction with resistors 18, 19 and 21 supply a regulated reference voltage to opposite ends of the thermistor bridge 7. Cell thermistor 8, resistor 16 and ambient thermistor 9 form one side of the bridge and potentiometer 17 the other. The potentiometer 17 is adjusted so as to produce an initial bridge imbalance, the magnitude of which is determined by the desired cooling rate. The bridge outputs are taken from the arm of potentiometer 17 and the junction of cell thermistor 8 and resistor 16. The voltage potential at the potentiometer arm remains constant while the potential at the junction varies in accordance with the ratio of the sum of the resistances of the ambient thermistor 9 and resistor 16 to the resistance of the series combination of cell thermistor 8, resistor 16 and ambient thermistor 9, producing a voltage potential that increases as the thermistor resistances decrease or whenever the detector cell temperature rises above a predetermined level relative to ambient temperature. It is to be noted that the presence of resistor 16 causes the cooling rate to rise more rapidly at the high temperatures than at low temperatures. This occurring due to the decrease in thermistor resistances at high temperature and the resultant increase in the aforementioned resistance ratio.

The symmetrical double-ended output of the thermistor bridge 7 is fed to the differential amplifier 5 where the thermistor leg signal is filtered by the combination of resistor 22 and capacitor 23 thereby suppressing random pick-up noise. The thermistor leg signal is then conducted to the base of transistor 25 and the potentiometer leg signal to the base of transistor 26. These transistors in combination with resistors 24, 27, 28, 29 and 30 comprise a differential amplifier having a non-symmetrical output signal proportional to the difference between the output voltages of the thermistor bridge 7. The output of the differential amplifier 5 is conducted to the direct current amplifier 4 containing amplifying circuitry consisting of transistor 35, resistors 31, 32 and 38, and capacitor 33; and emitter follower output circuitry comprising transistors 36 and 37 and resistor 34. The emitter follower circuitry provides a low impedance output for the direct current amplifier 4. The signal produced by the direct current amplifier 4 is transmitted to the junction of diodes 43 and 44 which form a part of the D.C. to D.C. converter and series regulator 3. The D.C. to D.C. converter and series regulator 3 comprises an astable multivibrator consisting of transistors 41 and 42, resistors 39, 40, 46 and 47, capacitor 45, saturable core transformer 48, and the aforementioned diodes 43 and 44; and rectifier circuitry containing diodes 49 and 50 and capacitor 51. This circuitry chops the D.C. power supply 10 voltage and rectifies it, providing an energization current for the thermoelectric cooler 2. The output of this device is controlled by clamping the bases of transistors 41 and 42 by means of the aforementioned diodes 43 and 44, to a reference voltage established by the output signal of the direct current amplifier 4, thus producing a thermoelectric cooler energization current proportional to the output of thermistor bridge 7.

FIG. 5 presents low temperature bias voltage control circuitry energized by the D.C. power supply 10. An auxiliary D.C. voltage 11 supply provides particular values of excitation required for operation of the bias voltage compensation amplifier 12. The auxiliary D.C. voltage supply 11 comprises an astable multivibrator made up of transistors 62 and 63, resistors 52, 53, 55, 56, 57 and 58, capacitors 60 and 61, and diodes 54 and 59; a fullwave rectifier comprising capacitors 64 and 65, diodes 66, 67, 68 and 69; and filtering circuitry of resistor 70 and capacitor 71. The bias voltage compensation amplifier 12 contains an ambient thermistor 98 which in combination with resistors 72, 73 and 75 control the conductance of transistor 76. As the ambient temperature decreases, the resistance of the thermistor 98 increases causing the voltage on the base of transistor 76 to rise thereby increasing its conductance. Transistor 76 and diode 77 form an emitter follower circuit, the output of which corresponds to its signal input. The circuit parameters are chosen to provide a linearly increasing output as ambient temperature falls below a predetermined level. Diode 77 prevents the output voltage from going negative more than the forward voltage drop of the diode 77 which is relatively small.

The output of the bias voltage compensation amplifier 12 is then conducted to the detector bias supply 13 where through diode 78, resistor 79, and ballast resistor 82 it is connected to one side of detector cell 1. Capacitor 80 is placed across the series combination of ballast resistor 82 and detector cell 1 for noise suppression and at the same time the normal detector cell bias voltage established by Zener diode 81 in combination with resistor 87 is added to the other side of detector cell 1. This results in a total bias voltage across detector cell 1 which increases proportionally to the decrease in ambient temperature below a specified level. This increasing bias voltage produces an apparent gain in detector cell sensitivity.

The embodiment of this invention clearly demonstrates control of the output signal of an infrared detector cell. It is accomplished by applying controlled cooling and compensated bias voltage to the detector cell, thereby producing a detector cell essentially free of output variations caused by changes in environmental temperature. It is realized however, that upon a reading of the foregoing description by one skilled in the art, many possible modified and variant forms of this invention will become apparent, and while the disclosed form is that most suitable to the specifically described application, certain modifications may be advantageous under particular conditions. For example, over a limited range of effectiveness adequate control of the detector cell output may be achieved by the application of cell bias compensation or ballast resistor variation without the addition of cooling. Further, reversal of the thermoelectric cooler current may be effected so as to heat rather than cool the cell thereby establishing a form of low ambient temperature compensation, or again varying combinations of both temperature and cell bias control may be employed to obtain a particular response function. Thus, it is intended that this one embodiment be exemplary rather than exhaustive and that the many modifications which become obvious to one skilled in the art lie within the scope of the present invention.

What is claimed is:

1. An improved defective bearing detection system including an infrared detector cell for giving an output signal relative to the temperature of the bearing the improvement comprising, ambient temperature sensing means, and means responsive to said amibent temperature sensing means for controlling said detector cell output signal as a function of ambient temperature.

2. The improvement of claim 1 wherein the means for controlling said detector cell output signal includes means mounted in thermal relation to said detector cell for controlling said detector cell temperature as a function of ambient temperature.

3. The improvement of claim 2 wherein the detector cell output signal is controlled to a substantially constant level for bearing temperatures a fixed differential magnitude above ambient temperature over a range of ambient temperatures.

4. The improvement of claim 3 wherein the means for controlling said detector cell output signal further includes means for controlling said detector cell bias voltage as a function of ambient temperature.

5. An improved defective bearing detection system including an infrared detector cell for giving an output relative to bearing temperature the improvement comprising, ambient temperature sensing means, means responsive to said ambient temperature sensing means and mounted in thermal relation to said detector cell for controlling said detector cell temperature as a function of ambient temperature, and means responsive to said ambient temperature sensing means for controlling said detector cell bias voltage as a function of ambient temperature, whereby the detector cell output signal is controlled to a substantially constant level for bearing temperatures a fixed differential magnitude above ambient temperature over a range of ambient temperatures.

6. An improved defective bearing detection system including an infrared detector cell for giving an output relative to the temperature of the bearing the improvement comprising, a thermoelectric device mounted in thermal relation to and for changing the temperature of said detector cell, temperature sensing means mounted in thermal relation to said detector cell, a second temperature sensing means mounted away from said detector cell to respond to ambient temperature, circuit means including both said temperature sensing means for giving an output as a function of the ratio of the response of said cell temperature sensing means to the response of said ambient temperature sensing means, and means responsive to said circuit means output for energizing said thermoelectric device for controlling said detector output signal as a function of ambient temperature.

7. The improvement of claim 6 wherein the thermoelectric device is a thermoelectric cooling device.

8. The improvement of claim 6 wherein said circuit means comprises, a bridge circuit containing said two temperature sensing means in respectively different legs of said bridge circuit for giving an output as a function of the ratio of the responses of said cell temperature sensing means and said ambient temperature sensing means.

9. The improvement of claim 7 including third temperature sensing means mounted to respond to ambient temperature, detector bias voltage compensation means responsive to said third temperature sensing means for controlling the detector cell bias voltage so as to control the detector output signal as a function of ambient temperature.

10. An improved defective bearing detector system including an infrared cell for giving a signal in response to varying temperatures above ambient temperature of wheel hubs on moving vehicles, the improvement comprising, a thermoelectric cooling device mounted in thermal relation to said detector for cooling said detector cell, a thermistor temperature sensing element mounted in thermal relation to said detector cell, a second thermistor temperature sensing element mounted away from said detector cell for sensing ambient temperature, a thermistor bridge circuit including both thermistors giving an output voltage which is a function of the ratio of said detector cell temperature to ambient temperature, a differential amplifier connected to the output of said bridge for amplifying said output of said bridge circuit, a D.C. amplifier connected to said differential amplifier for amplifying output of said differential amplifier, a feedback network for conducting a portion of said D.C. amplifier output to said differential amplifier input to provide increased stability to the amplifier circuitry, a D.C. to D.C. converter and series regulator controlled by said D.C. amplifier output for energizing said thermoelectric cooling device, a third thermistor temperature sensing element mounted with said second thermistor for sensing ambient temperature, a bias voltage compensation amplifier containing said third thermistor supplying a voltage output which is a function of ambient temperature, an auxiliary D.C. power supply for energizing said bias voltage compensation amplifier, and a normal detector bias voltage supply applying the output of said bias voltage compensation amplifier in combination with a normal bias voltage to said detector cell, whereby the detector cell output signal is controlled to a substantially constant level for bearing temperature a fixed differential magnitude above ambient temperature over a range of ambient temperatures.

11. The invention of claim 10 wherein the D.C. to D.C. converter and series regulator means comprises in combination, an astable multivibrator for giving a pulsating voltage output, a transistor pair forming a part of said astable multivibrator, two diodes each connecting to a different transistor base of said transistor pair and to said D.C. amplifier output, and means for converting said pulsating voltage output to a D.C. voltage.

References Cited

UNITED STATES PATENTS

| | | | |
|---|---|---|---|
| 3,103,587 | 9/1963 | Ure et al. | 250—83.3 |
| 3,183,349 | 5/1965 | Barnes et al. | 250—83.3 X |
| 3,225,201 | 12/1965 | Cook | 250—83.3 |
| 3,244,875 | 4/1966 | Crane et al. | 250—83.3 X |
| 3,263,090 | 7/1966 | Blocher | 246—169 X |

RALPH G. NILSON, *Primary Examiner.*

A. B. CROFT, *Assistant Examiner.*

U.S. Cl. X.R.

246—169